Aug. 6, 1957 H. L. MYRENT ET AL 2,802,081
IMMERSION TYPE THERMOSTAT
Filed Dec. 7, 1955 2 Sheets-Sheet 1
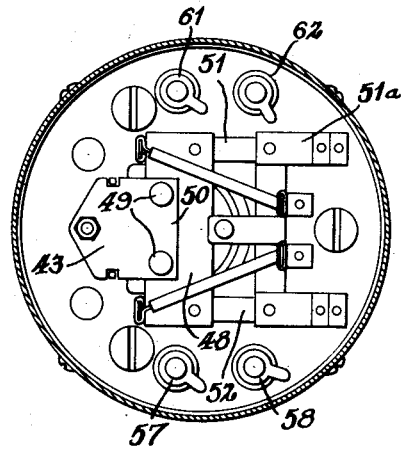
Inventors
Harry L. Myrent
John T. Elwood
by Harvey M. Gillespie
Atty.

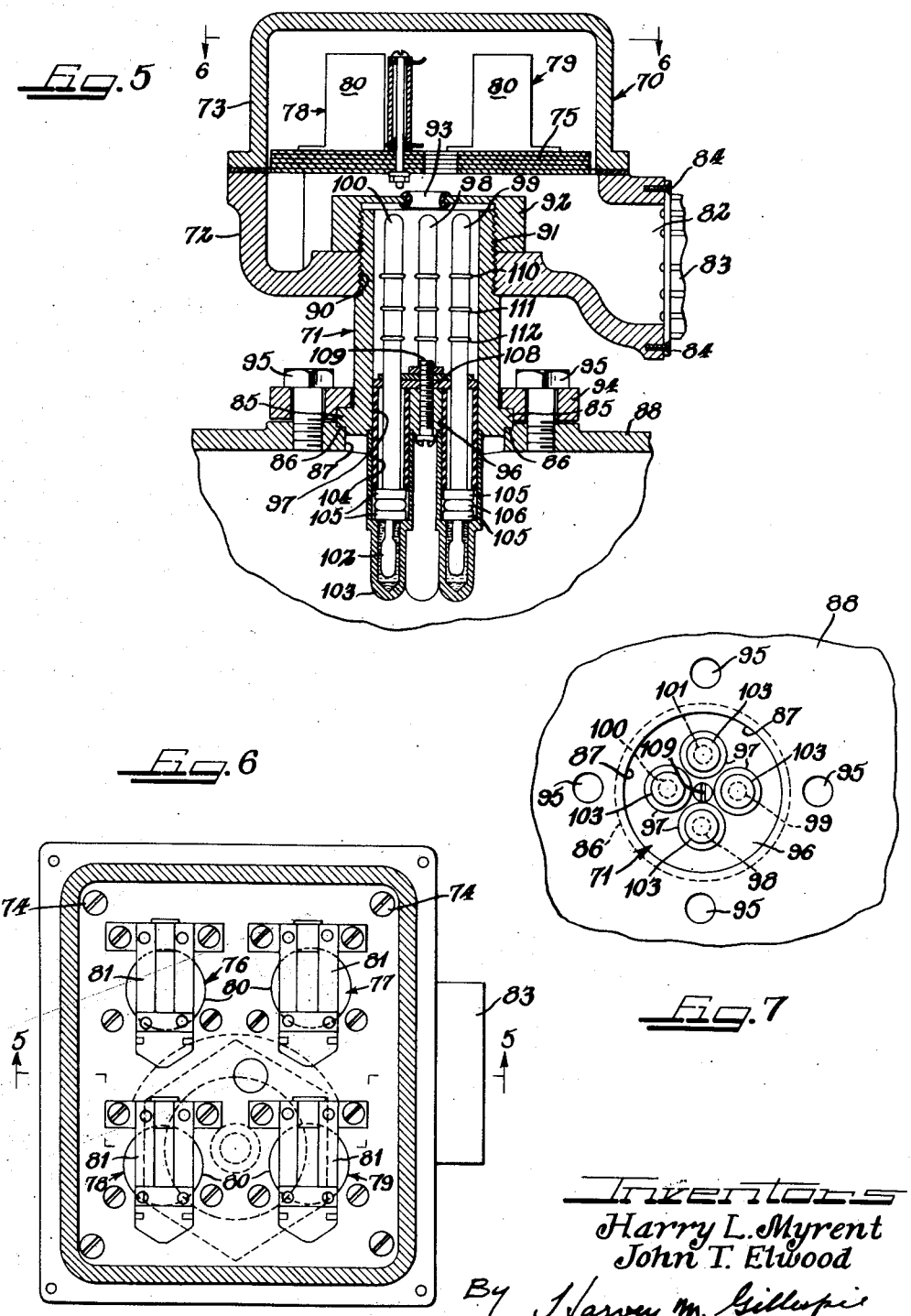

United States Patent Office 2,802,081
Patented Aug. 6, 1957

2,802,081
IMMERSION TYPE THERMOSTAT

Harry L. Myrent, Chicago, Ill., and John T. Elwood, Stamford, Conn., assignors to Vapor Heating Corporation, Chicago, Ill., a corporation of Delaware Application December 7, 1955, Serial No. 551,591

10 Claims. (Cl. 200—141)

The present invention relates to thermostat constructions and more particularly to thermostat assemblies of the immersion type having one or more thermostat elements adapted to extend into a circulating fluid, for example the coolant fluid circulating through the engine block of a diesel-electrolocomotive and in which the thermostat is operable when a predetermined temperature in the fluid has been attained to close an electrical contact in a control circuit to initiate a predetermined function such as the energization of a heat dissipating or cooling device, or the operation of a signal or the like.

Such a thermostat and its application in a heating system is shown and described in our co-pending application Serial No. 336,244, filed February 11, 1953, for Thermostatically Controlled Temperature Regulating System, of which the present application is a continuation-in-part.

The principal object of the present invention is to provide a novel form of thermostat assembly wherein the thermostatic element or elements, as the case may be, are effectively shielded or sealed from contact with or exposure to the fluid in which they are constructively immersed, while at the same time they are in an extremely effective heat exchange relation with respect to the fluid, whereby they are promptly and highly sensitive to slight variations in temperature changes within the fluid.

A further object of the invention, in one form thereof, is to provide a novel form of immersion thermostat assembly including a plurality of independently operable thermostat units arranged in a compact cluster within a common casing, each thermostat being thermally insulated from the others yet being in intimate heat-exchange relation to the fluid the temperature of which is undergoing sensing by the various thermostats and in which they are immersed.

Another object of the invention is to provide a thermostat assembly of the character briefly outlined above in which a thermostat unit, together with a relay device whose operation is controlled by such unit is positioned within a housing to provide a "package type" unit capable of quick assembly in a particular installation and ready removal therefrom for purposes of inspection, replacement or repair.

Other objects and advantages of the invention will become more readily apparent as the nature of the invention is better understood.

In the accompanying drawings two embodiments of the invention have been shown.

In these drawings:

Fig. 1 is a sectional view taken substantially centrally and vertically through a thermostat assembly constructed in accordance with the principles of the present invention.

Fig. 2 is a top plan view of the assembly of Fig. 1 with a portion of the housing broken away.

Fig. 3 is a sectional view taken on line 3—3 of Fig. 1.

Fig. 4 is a circuit diagram illustrating schematically the assembly of Figs. 1 to 3 inclusive in an actual installation.

Fig. 5 is a sectional view similar to Fig. 1 showing an assembly including plural thermostat units arranged in a cluster and installed in a conduit section or the like.

Fig. 6 is a sectional view taken substantially along the line 6—6 of Fig. 5; and Fig. 7 is an inverted view of the structure shown in Fig. 6.

In Figs. 1, 2 and 3, an assembly including a single immersion thermostat controlling the operation of a single relay device has been shown. In Figs. 5, 6 and 7 a multiple thermostat assembly including a thermostat cluster controlling the operation of several relay devices has been illustrated.

The assembly shown in Figs. 1, 2 and 3, inclusive, involves in its general organization a cylindrical body casting 10 provided at one end with a flanged portion 11 to which a base 12 of a relay assembly 13 is secured by screws 14. The other end of the body casting 10 is of reduced diameter design and is provided with external threads 15 for reception in a threaded opening in a conduit section or other fluid container 16. The flanged end of the body 10 is relieved to provide a well 17, the closed end 18 of which is provided with an axial bore 19 communicating with a counterbore 20 extending inwardly from the threaded end of the body and is of slightly larger diameter than the bore 19.

An immersion well 21, in the form of a thimble-like casing has its open end brazed or otherwise suitably secured in the counterbore 20. The closed lower end of the immersion well 21 is reduced in diameter as shown at 22 and provides an intermediate ledge or shelf 23 within the casing. A thermostat 24 of a mercury column type is adapted to be removably clamped in centered position within the immersion well 21 and is provided with a cylindrical body portion having a reduced lower end 25 constituting a mercury reservoir which extends into the reduced end portion 22 of the well 21. The thermostat also includes a second reduced portion 26 which defines a second mercury reservoir. An annular bead 27 formed integrally with the glass tubular body of the thermostat is seated upon a compression clamping ring 28 which in turn seats on the ledge or shelf 23. A second clamping ring 29 of compressible material is positioned to bear against the opposite side of the bead 27 and is clamped thereagainst by means of an insulating sleeve 30 telescopically received within the well 17 and the immersion well casing 21. The said sleeve is maintained in position by virtue of its frictional engagement with the cylindrical wall of the bore 19 and by its abutting engagement with the base 12 of the relay assembly 13. When the said base 12 is secured to the flange portion 11 of the body casting it exerts slight pressure lengthwise of the sleeve 30 so as to slightly compress the resilient clamp ring 29 and thereby securely hold the thermostat in position. The reduced portion 22 of the immersion well may be filled with a suitable thermally conductive compound such as a mixture of silicon grease and graphite so as to provide a highly sensitive thermal conductive packing between the mercury reservoir 25 of the thermostat and the immersion well.

An electrical heating coil 31 is wound about the smaller diameter of the thermostat defining the second mercury reservoir 26. The function of the electrical heater 31 is to recurrently apply auxiliary heat to the thermostat, the purpose of which will be presently explained. Electrical lead-in wire 32 and the lead-out wires 33 and 34 are connected to the auxiliary heater 31 and pass out of the sleeve 30 through slots 35—35 formed at the upper end thereof.

The thermostat body is shown as being provided with two spaced apart contacts 36 and 37 electrically connected to the mercury column of the thermostat and also connected to lead-out wires 38 and 39, respectively, which pass out through the said slots 35—35 of the sleeve 30.

Referring now to the relay assembly 13: It is attached to the base 12 within a slipover housing 40 which is secured to the base by means of screws 41. The relay proper is of conventional construction including a magnet 42, an armature 43 pivotally supported to a support 44 and biased away from the core 45 of the magnet by means of a tension spring 46. This biased movement of the armature 43 is limited by an adjustable stop screw 47. Secured to the armature 43 is a cross plate 48 of insulating material, for example hard rubber or other suitable compound, the said plate being secured to the armature by means of rivets 49 which extend through a metallic washer plate 50. Secured to the outer ends of plate 48 are contact arms 51—52 which are moved by the said armature into and out of engagement with the spaced contacts 51a—51b and 52a and 52b.

Referring now to Fig. 4 wherein the circuitry for the thermostat and relay are shown: The thermostat is shown schematically in an actual installation wherein it is desired to actuate suitable signals 53 and 54. The immersion casing 21 of Fig. 1 is deemed to be located so that its lower end is submerged within a fluid passing through the conduit and the signals are to indicate the temperature condition of said fluid, the signal 53 indicating the normal or desired temperature condition of the fluid and the signal 54 being adapted to indicate the upper limit of the fluid temperature.

The electrical heater 31 associated with the thermostat is connected across the positive and negative lines 55—56, by means of the conductors 32—33, there being a limiting resistor 57 interposed in the conductor 33. A manually variable resistor 58 is interposed in conductor 34 whereby the temperature of the heater 31 may be varied and thereby adjust the temperature setting of the contact 36 of the thermostat. The magnet 42 of the relay is connected across the lines 55 and 56 by means of conductors 59 and 60 and its energization is controlled by the shunt circuit composed of conductors 38 and 39 which lead from the electrodes 36 and 37 of the thermostat 24 and join with conductors 59 and 60 at opposite sides of the electro-magnet 42. A suitable resistor 61 is interposed in conductor 59 and a like resistor 62 is interposed in conductor 60, these resistors being preferably secured to the base 12 of the relay assembly. As long as the mercury column of thermostat 24 remains below the thermostat electrode 37 the relay magnet 42 will be energized and the contacts 51—52 will be engaged with fixed contacts 52a—52b and thereby establish an energizing circuit for the signal 53. If and when the mercury column engages the thermostat electrode 37 the shunt circuit is established so as to short out the relay magnet 42 and thereby permit the spring 46 to move the relay armature in a position to close the contacts 51a—51b and thereby energize the signal 54. The signal circuit, it will be understood, is shown merely as one example of working circuits connected through the contacts 51a—51b and 52a—52b. Obviously, various electrical devices might be substituted for the signals 53 and 54.

Referring now to Figs. 5, 6 and 7, wherein a multiple unit thermostat assembly has been shown, the assembly involves in its general organization a relay magnet housing 70 and a thermostat immersion housing 71. The relay magnet housing is comprised of two parts, namely a base member 72 and a cover member 73, the latter being held in position on the base member by means of clamping screws 74. The members 72 and 73 serve to clamp therebetween an insulating disk assembly 75 on which there is mounted a series of four relay magnet assemblies 76, 77, 78 and 79, each of which is operable under the control of a respective thermostat unit contained within the immersion housing 71. The relay magnet assemblies are conventional in design, each including a magnet proper 80, its movable armature 81, relay contacts (not shown) and other instrumentalities common to such devices. The base member 72 is formed with a lead-out opening 82 for the various circuit wires and the usual micarta outlet terminal assembly 83 is applied to the opening 82 by means of attachment screws 84.

The thermostat housing 71 is in the form of a generally cylindrical open-ended casing having a seating flange 85 adjacent one end adapted to seat on a ledge 86 surrounding an immersion opening 87 provided in a conduit section 88 with which the present thermostat assembly may be associated. The upper end of the casing 71 is threaded as at 90 and is threadedly received within an opening 91 provided in the base member 72. The casing is clamped in position by means of a cap member 92 threadedly received over the upper end thereof. A ferrule 93 seated in an opening in the cap member 92 affords a lead-out for the various electrical connections extending to the thermostat contacts. The lower end of the casing 71 is maintained in position over the opening 87 by means of a clamping ring 94 overlying the flange 85 and secured to the conduit section 88 by studs 95.

The casing 71 is formed with a web 96 extending across its lower end and provided with a series of spaced openings through each of which there extends a thermostat tube of the mercury column type, the four thermostats being designated at 98, 99, 100 and 101. Each thermostat has its lower end or bulb portion 102 disposed within an immersion well 103 in the form of a deep thimble-like casing, the open end of which is brazed in position within one of the openings 97 in the web 96. A spacer sleeve 104 surrounds each thermostat and a pair of packing rings 105 on opposite sides of a bead 106 on the thermostat tube and serving to retain the thermostat in its nested relation within its associated immersion well 103 and supported from an internal shoulder 107 within the well. A sealing washer assembly 108 is held in position within the casing 71 by a nut and bolt assembly 109 which passes through the web 96. If desired, the various immersion wells 103 may be filled with a suitable liquid or semi-liquid such as a mixture of silicon grease and graphite to afford good thermal conductivity.

The various thermostats are identical in construction except that they may be set to function at different temperatures. Each is provided with spaced contacts 110, 111 and 112, the latter contact being a common contact normally below the level of the mercury column of the thermostat and the other two defining the upper and lower limits of a predetermined temperature range. For a specific application of the present assembly wherein the four thermostats define temperature ranges which overlap each other, reference may be had to our co-pending application mentioned above.

What we claim is:

1. A thermostat and relay assembly comprising a body member having a central opening therethrough, an immersion well comprising a tubular shell closed at one end and open at the other and having its open end secured in the central opening of said body, a thermostat of mercury column type extending through said body and into said immersion well, means providing a cushion for supporting the thermostat within said well and means comprising a sleeve surrounding the major portion of the thermostat and positioned in said body and said immersion well to hold the thermostat centered in said well, and a relay assembly clamped to the other end of the body member and bearing against an end of said sleeve to maintain it in position within the body and said well.

2. In a thermostat assembly of the character described, a body having a lower open end, an immersion well comprising a tubular shell having a lower closed end and an open upper end, said upper end of the well extending into said lower open end of the body and being sealed with respect thereto, means providing an internal shoulder medially of said well, a thermostat of the mercury column type having an elongated body provided with a medial bead thereon, said thermostat extending downwardly into said well to a region adjacent the bottom thereof with said bead adjacent said shoulder, a clamp ring intermediate said bead and said shoulder, and means for clamping said bead against said clamp ring and shoulder to retain the thermostat within the well against dislodgment.

3. In a thermostat assembly of the character described, the combination set forth in claim 2 wherein said shoulder is presented by an offset in said well.

4. In a thermostat assembly of the character described, in combination, a body having a lower open end, an immersion well comprising a tubular shell having an open upper end extending into the opening provided in said body and sealed with respect thereto, the lower regions of said shell being of reduced diameter and being connected to the upper regions thereof by an annular ledge portion, a thermostat comprising an elongated body provided with a medial bead thereon, a clamping ring disposed within said shell and supported on said ledge portion, said thermostat being at least in part disposed within said shell with its lower regions extending into the reduced portion of the shell below said ledge portion and with said bead resting upon said clamping ring, a second clamping ring within said shell above said bead, and means for clamping said second clamping ring against said bead to cause the latter to be engaged between both rings to center the thermostat in position within the shell.

5. In a thermostat assembly of the character described, the combination set forth in claim 4 wherein said clamping means comprises a sleeve surrounding the thermostat and extending axially into said shell and bearing at its lower end against said upper clamping ring, and bearing at its upper end against a member fixed relative to the body.

6. In a thermostat assembly of the character described, the combination set forth in claim 5 wherein the reduced portion of said shell contains a thermally conductive packing in intimate contact with the walls of the shell and with said thermostat.

7. In a thermostat assembly of the character described, a tubular casing having a lower open end and provided with a central bore, means closing the upper end of said casing, a web extending across the lower open end of said casing, said web being provided with a series of openings therethrough, a relatively deep immersion well having an open upper end secured in each of said openings in sealing relation with respect thereto, said immersion wells being formed with closed lower ends with the lower ends thereof arranged in closely spaced relation, a thermostat of the mercury column type disposed within each of said wells, a plurality of contacts for each thermostat, said thermostats having their lower ends extending downwardly into the respective wells and having their upper regions projecting upwardly through the upper ends of the wells and into said tubular casing, there being an opening in the closed upper end of said casing, and a lead wire extending from each of said contacts outwardly through said latter opening.

8. In a thermostat assembly of the character described, the combination set forth in claim 7 including a quantity of a thermally conductive material disposed within each of said wells and in intimate contact with the thermostat therein.

9. A thermostat cluster of the character described comprising in combination a main housing adapted to contain relay mechanism and an immersion casing depending from said main housing and providing in combination with the main housing a well designed for immersion in a liquid subject to fluctuating temperature changes, a plurality of thermostats of the mercury column type each having bulb portions disposed adjacent the bottom of said well, and a thermally conductive fluid disposed within said well in which said bulbs are immersed.

10. A thermostat cluster of the character described comprising in combination a main housing adapted to contain relay mechanism, and an immersion casing depending from said main housing and providing in combination with the main housing a relatively deep well designed for immersion in a liquid subject to temperature fluctuations, a plurality of elongated thermostats of the mercury bulb and column type disposed within said immersion casing with their bulb portions arranged in close proximity to one another adjacent the bottom of said well, said main housing being provided with a lead-out opening for relay circuit wires, said immersion casing having an open end normally in communication with the interior of said main housing, and a closure member for said open end, said closure member being formed with a lead-through opening for passage of circuits wires extending from the thermostats to said relay mechanism.

References Cited in the file of this patent

UNITED STATES PATENTS

| | | |
|---|---|---|
| 2,049,562 | Harper | Aug. 4, 1936 |
| 2,192,276 | Schaefer | Mar. 5, 1940 |
| 2,610,236 | Smith | Sept. 9, 1952 |